Figure 1:
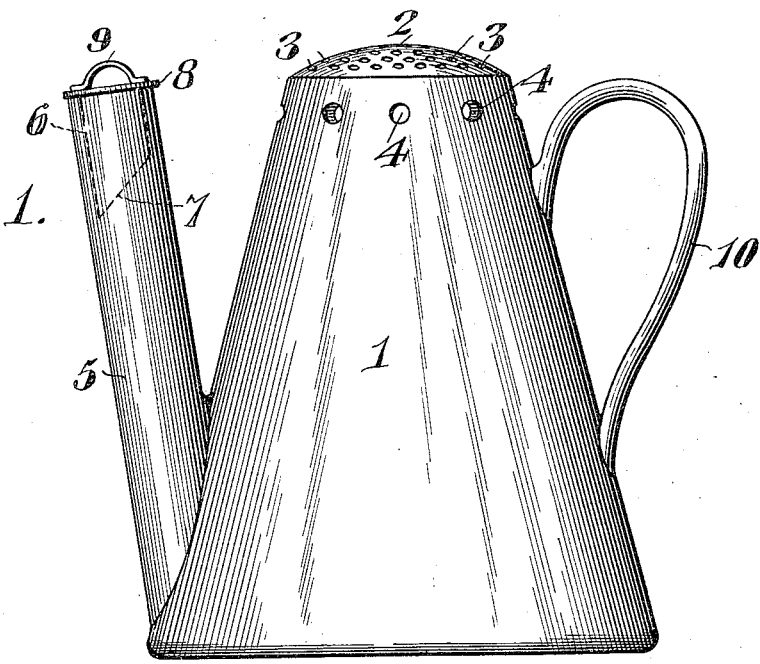

C. P. WILKINSON.
FUMIGATING APPARATUS.
APPLICATION FILED FEB. 27, 1912.

1,065,013.

Patented June 17, 1913.

WITNESSES
Jas. K. McCathran
F. T. Chapman

C. P. Wilkinson, INVENTOR
BY
E. G. Siggers
ATTORNEY

UNITED STATES PATENT OFFICE.

CICERO POWEL WILKINSON, OF RIVERSIDE, CALIFORNIA.

FUMIGATING APPARATUS.

1,065,013.     Specification of Letters Patent.     Patented June 17, 1913.

Application filed February 27, 1912. Serial No. 680,241.

*To all whom it may concern:*

Be it known that I, CICERO P. WILKINSON, a citizen of the United States, residing at Riverside, in the county of Riverside and State of California, have invented a new and useful Fumigating Apparatus, of which the following is a specification.

This invention has reference to improvements in fumigating apparatus, and is designed more particularly for the fumigation of trees or the like.

It is customary to treat trees for the destruction of scale or other deleterious living matter by producing about the trees an atmosphere conveying a sufficiently large proportion of cyanogen to cause the destruction of the parasitic growths, and in order to accomplish this result it is customary to inclose a treated tree by a tent. It is also the custom to produce the killing atmosphere by placing in an earthenware vessel a suitable quantity of dilute sulfuric acid and to then place in the dilute acid within the vessel a suitable quantity of potassium cyanid. A violent chemical action at once takes place, and gas is given off, being confined to the immediate neighborhood of the tree by the tent. While such treatment is very efficacious, it is often destructive to the tents, for the violent chemical action causes more or less spattering of the acid, and some of it frequently reaches the tent walls burning and rotting the tent, which is made of canvas, so that the life of the tent is comparatively short.

It is the object of the present invention to provide a container for the chemicals in which the reaction may take place and from which the gas or vapor may readily escape, but from which there is practically no liability of the spattering of the acid, and consequently the tent is saved from destruction or injury and its life is indefinitely prolonged.

In accordance with the present invention there is provided a vessel, which, like those in ordinary use for the purpose, is preferably made of earthenware glazed inside and out. This vessel may be wide at the base and tapered toward the top where it is closed, except that there are provided numerous perforations both through the top and adjacent thereto, and these perforations are preferably at an angle to the longitudinal axis of the vessel, so that any acid which may find its way to the top of the vessel due to the violent agitation because of the chemical reaction, will come in contact with a wall, and be so deflected that its momentum will be lost to an extent preventing it from reaching the walls of the surrounding tent. The vessel is provided with a spout leading to the bottom thereof, and this spout is in turn provided with a removable closure, so shaped as to constitute a receptacle for the potassium cyanid, and may be of a size to contain a suitable charge without the necessity of other means therefor. Furthermore the charge containing receptacle will effectually close the end of the spout, so that no acid may escape therethrough.

The invention will be best understood from a consideration of the following detailed description taken in connection with the accompanying drawings forming a part of this specification, and since the invention is by no means confined to any strict conformity with the showing of the drawings, the structure may be changed and modified in various respects so long as such changes mark no material departure from the invention.

Figure 2:
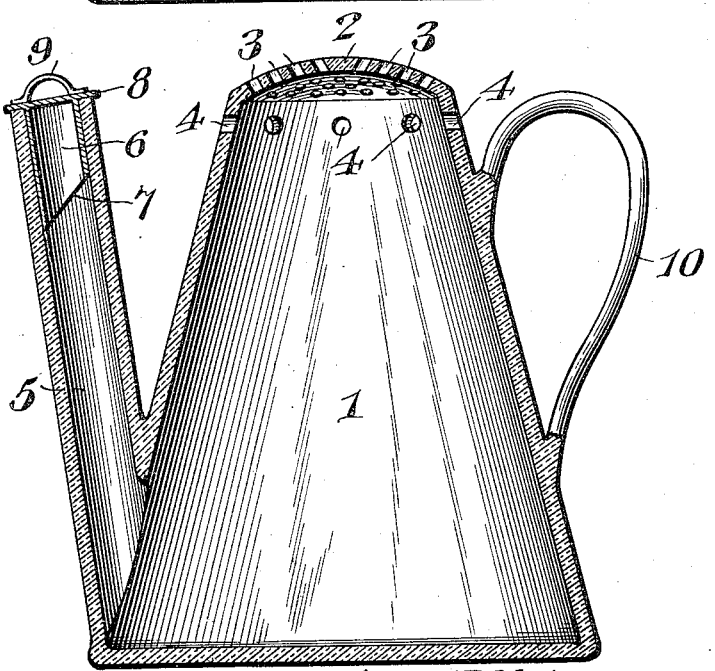

In the drawings: Figure 1 is an elevation of the improved fumigating apparatus. Fig. 2 is a central vertical section thereof with some parts shown in elevation.

Referring to the drawings there is shown a receptacle or container 1 indicated as substantially frusto-conical in shape, but this particular shape is by no means mandatory, although it answers the purpose of the invention and furthermore adds to the stability of the apparatus by presenting a broad supporting base. The receptacle is provided with a top portion 2, which is preferably slightly domed, as indicated, and through this dome there are formed numerous perforations 3 preferably directed outwardly from the longitudinal central axis of the receptacle or container 1. Close to the top and but slightly below the same there is shown a circular series of perforations 4, the axes of which are substantially perpendicular and radial to the longitudinal axis of the receptacle or container, but even this relation is not at all mandatory. In both series of perforations 3 and 4 the probability of any liquid passing through them unimpeded is practically eliminated, since these perforations are at sufficient angles to the usual movement of any liquid particles to prevent them from escaping from the vessel 1, or greatly impeding their progress by causing rebounding of such liquid particles on striking the walls of the perforations. Furthermore, the conical form of the body member of the vessel or receptacle also contributes to the impeding of liquid particles and directing them in other paths than straight out through the perforations.

Extending from the vessel is a spout-like member 5 uprising from a point near the bottom of the vessel where the spout-like member is in free communication with the interior of the vessel and terminating adjacent the top of the vessel. The spout or duct 5 diverges from the body of the vessel as the upper end is approached, although this particular relation is by no means mandatory. The spout or duct 5 is preferably of about the same internal diameter throughout, and is also preferably cylindrical in cross section. Adapted to the upper or entering end of the conduit 5 is a closure 6 having its body portion cylindrical when the duct 5 is cylindrical, while one end of this closure 6 is beveled, as indicated at 7, and the other end is provided with a cap member 8 of sufficient lateral extent to engage the end of the duct 5 when the main body of the closure 6 is within the said duct. A handle 9 is provided for convenience of manipulation of the closure 6, which not only serves as a closure, but as a holding scoop for the material to be introduced into the vessel or receptacle 1. At one side of the vessel 1, preferably that opposite the duct 5, there is provided a manipulating handle member 10 of any convenient form and size.

The vessel 1 is placed within the tent, which is assumed to be surrounding the tree to be treated, the broad base of the vessel usually resting on the ground, and this broad base contributing materially to the stability of the device. Water and acid are introduced into the vessel either separately, or the acid may be first diluted before being placed into the vessel, and as the latter is preferably made of earthenware glazed inside and out it is proof against any harm from the action of the acid, which latter is usually sulfuric acid.

The scoop or closure 6 receives the potassium cyanid, and is then placed at the open end of the duct 5, so as to cause gravitation of the potassium cyanid into the duct, the scoop being properly inverted for the purpose and then pushed down until the cap portion 8 arrests further movement of the scoop or closure into the duct. This closure 6 may be made of metal properly protected by japan or other coating and serves to prevent any escape of liquid from the duct. The chemical action is violent and rapid, and even though there be violent ebullition within the receptacle and the acid be greatly agitated and thrown about within the vessel, the angle position of the perforations 3 and 4 prevents any such escape of the acid as would permit it to reach the walls of the tent to thereby injure or destroy the tent fabric. The closure 6 effectually prevents the escape of any acid through the conduit 5. When the chemical action has ceased the vessel may be removed from the tent and the liquid therewithin is poured out, after which the vessel may be thoroughly cleansed, the closure 6 being first removed.

In practice the walls of the vessel may approach a half inch in thickness, and, therefore, the perforations 3 and 4, which need not individually be of large diameter, are sufficiently long to prevent any accidental escape of the acid contents of the vessel while in action.

What is claimed is:—

1. A fumigating apparatus comprising a vessel with an interior chamber for the reception of fumigating materials, said vessel having a top portion in one piece with the body of the vessel and provided with perforations of a size and each directed at an angle with respect to the longitudinal axis of the vessel to intercept liquids projected against the inner wall of the top, said vessel being provided with a duct rising from one side thereof near its basic end and there opening into the vessel and having the upper end provided with a removable closure adapted to prevent accidental escape of material therefrom.

2. A fumigating apparatus comprising a frusto conical vessel having a top provided with perforations in outwardly inclined relation to the longitudinal axis of the vessel at an angle and of a length to intercept liquids projected against the inner wall of the top of the vessel by ebullition of such liquids, and also provided adjacent the top with a series of perforations extending through the frusto conical walls substantially perpendicular to the longitudinal axis of the vessel, the latter being also provided with a duct rising from one side thereof near its basic end and there opening into the vessel and having the upper end provided with a removable closure adapted to prevent accidental escape of liquid therefrom.

In testimony, that I claim the foregoing as my own, I have hereto affixed my signature in the presence of two witnesses.

CICERO POWEL WILKINSON.

Witnesses:
O. A. LOWENTROUT,
CHAS. O. REID.

---

Copies of this patent may be obtained for five cents each, by addressing the "Commissioner of Patents, Washington, D. C."